US008125591B2

(12) United States Patent
Masutani et al.

(10) Patent No.: US 8,125,591 B2
(45) Date of Patent: Feb. 28, 2012

(54) METHOD OF FORMING AN ARRAY OF POLYMER DISPERSED LIQUID CRYSTAL CELLS

(75) Inventors: Akira Masutani, Stuttgart (DE); Bettina Schueller, Stuttgart (DE); Anthony Roberts, Stuttgart (DE); Akio Yasuda, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1230 days.

(21) Appl. No.: 11/816,427

(22) PCT Filed: Jan. 31, 2006

(86) PCT No.: PCT/EP2006/000821
§ 371 (c)(1),
(2), (4) Date: Aug. 16, 2007

(87) PCT Pub. No.: WO2006/087094
PCT Pub. Date: Aug. 24, 2006

(65) Prior Publication Data
US 2008/0160220 A1    Jul. 3, 2008

(30) Foreign Application Priority Data
Feb. 16, 2005    (EP) .................................... 05003284

(51) Int. Cl.
*G02F 1/1333*    (2006.01)
*C09K 19/02*    (2006.01)

(52) U.S. Cl. ................ 349/86; 349/88; 349/89; 349/90; 349/183
(58) Field of Classification Search .................... 349/86, 349/88–90, 183
See application file for complete search history.

(56) References Cited

U.S. PATENT DOCUMENTS

| | | | |
|---|---|---|---|
| 5,274,481 A | 12/1993 | Kim | |
| 5,956,112 A * | 9/1999 | Fujimori et al. | 349/156 |
| 6,650,384 B2 * | 11/2003 | Oguchi et al. | 349/86 |
| 6,690,443 B1 | 2/2004 | Poliakine | |
| 7,034,907 B2 * | 4/2006 | West et al. | 349/86 |
| 2002/0126249 A1 | 9/2002 | Liang et al. | |
| 2005/0016441 A1 | 1/2005 | Masutani et al. | |

OTHER PUBLICATIONS

Masutani, et al., "A novel polarizer-free dye-doped polymer-dispersed liquid crystal for reflective TFT displays", Journal of the Society for Information Display, vol. 12, No. 3, pp. 301-307, XP002351552, 2004.
Masutani, et al., "6.2: Improved Performance of Novel Polariser-Free Dye doped Polymer Dispersed Liquid Crystal for Reflective Display", Conference record of the International Display Research Conference, pp. 88-91, XP009055881, 2003.

* cited by examiner

*Primary Examiner* — Mark Robinson
*Assistant Examiner* — Charles Chang
(74) *Attorney, Agent, or Firm* — Oblon, Spivak, McClelland, Maier & Neustadt, L.L.P.

(57) ABSTRACT

The present invention relates to a method of forming an array of polymer dispersed liquid crystal cells, to an array formed by such method and to uses of such array.

24 Claims, 11 Drawing Sheets

RGB-Filter

METHOD OF FORMING AN ARRAY OF POLYMER DISPERSED LIQUID CRYSTAL CELLS

The present invention relates to a method of forming an array of polymer dispersed liquid crystal cells, to an array formed by such method and to uses of such array.

Liquid crystal displays are one of the main fields of applications of liquid crystals. Liquid crystal displays have been in use for more than twenty years in clocks, calculators, displays in cars, mobile telephones and in displays of electronic devices. Flat screen technology developed over the last couple of years on the basis of LCDs have paved the way for portable personal computers. The same technology is also used in portable television sets. Liquid crystal displays are based on the use of electro optical effects which are reasonably well understood. By way of example of the twisted nematic cell (TN cell), the mechanism can be explained. The TN cell was developed by Schadt and Helfrich and is based on the following principle. A nematic liquid crystal having a positive dielectric anisotropy is placed between two glass plates spaced apart at a distance of 2-15 µm. The inner surface of the TN cell is coated with thin transparent electrode layers of for example ITO (indium tin oxide) and oriented layers of polyimide. The oriented layers of polyimide are prepared by rubbing in a preferred direction that the longitudinal axes of the liquid crystal molecules orient themselves in such direction. The preferred direction of both glass plates is twisted against each other by 90° such that a uniform twist of the molecular longitudinal axis of the liquid crystal molecules is achieved. Furthermore there are two polarizers placed on the outer surfaces of polarized glass plates which are themselves twisted by 90° against each other. The plane of oscillation of the light incident on the liquid crystal is turned by 90° when passing through the cell (wave guiding effect), the linear polarized light can pass through the second polarizer without problems and the cell is transparent. Upon application of a voltage to the electrode surfaces which voltage is greater than the onset voltage, the liquid crystalline molecules align themselves along the electric field direction, and only at the surface the original orientation remains. Hence the plane of polarization of the polarized light is no longer twisted, and the linearly polarized light can no longer pass the second polarizer. The cell appears dark. Turning the voltage off results in a recovery of the twisted structure of the nematic phase within a short time frame (approximately 10 ms, depending on the rotational viscosity of liquid crystals) and the cell appears light again.

The same technology is also used in principle in conventional color displays, wherein a fixed absorptive color filter is used in such an LCD display. The color filter merely acts as an optical wall to enable colonization of the inherently black and white display. Color can be generated by two different modes. In additive mode, three primary colors, namely red, green and blue, are used to create the entire spectrum by addition of color effects. In subtractive mode, the entire spectrum can be regenerated by using the three colors cyan, magenta and yellow. In the additive mode, a picture element (pixel) consists of three sub-elements ("subpixels") each of which has one color filter of the respective primary color. Therefore, for example, one sub-pixel is endowed with a red filter, another one with a green filter and another one with a blue filter. If such a pixel is to show a red image, the subpixels must become red-black-black, i.e. a voltage must be applied to those pixels having the green and the blue filter, whereas the subpixel bearing the red filter is turned off. This, in effect, means that in such a display $2/3$rds of the light available are inherently lost and the displays generated by such pixels are inherently rather dark.

There are many different forms of liquid crystal cells available at the moment, one of which is the so-called PDLC—(polymer-dispersed liquid crystal) display. This is achieved by preparing a homogeneous mixture of a liquid crystal and a prepolymer and thereafter inducing a phase separation by causing the pre-polymer to form a solid network, thereby inducing a liquid crystal to form droplets imbedded in the polymer network.

Various techniques have been developed to achieve such formation of a polymer network which are used depending on the individual circumstances. For example, when a pre-polymer material is miscible with a liquid crystal compound a phase separation by polymerization is used. This technique is referred to as polymerization-induced phase separation (PIPS). A homogeneous solution is made by mixing the prepolymer with the liquid crystal. Thereafter a polymerization is achieved through a condensation reaction, as with epoxy resins, or through a free radical polymerization, as with vinyl monomer catalyzed with a free radical initiator such as benzoyl peroxide, or by a photo-initiated polymerization. Upon polymerization the solubility of the liquid crystal decreases in the lengthening polymers until the liquid crystal forms droplets or an interconnected liquid crystal network within a growing polymer network. When the polymer starts to gel it will lock the growing droplets or the interconnected liquid crystal network thereby arresting them/it in their/its state at that time. The droplet size and the morphology of droplets or the dimensions of the liquid crystal network are determined during the time between the droplet nucleation/initiation of network formation and the gelling of the polymer. Important factors are the rate of polymerization, the relative concentrations of materials, the temperature, the types of liquid crystal and polymers used and various other physical parameters, such as viscosity, solubility of the liquid crystal in the polymer. Reasonably uniform size droplets can be achieved by this technique. Sizes prepared in the past have ranged from 0.01 µm-30 µm. Polymerisation induced phase separation (PIPS) is a preferred method for forming PDLC films. The process begins with a homogeneous mixture of liquid crystal and monomer or pre-polymer. Polymerisation is initiated to induce phase separation. Droplet size and morphology are determined by the rate and the duration of polymerisation, the types of liquid crystal and polymers and their proportions in the mixture, viscosity, rate of diffusion, temperature and solubility of the liquid crystal in the polymer (West, J. L., *Phase-separation of liquid-crystals in polymer*. Molecular Crystals and Liquid Crystals, 1988. 157: p. 427-441, Golemme, A., Zumer, S., Doane, J. W., and Neubert, M. E., *Deuterium nmr of polymer dispersed liquid crystals*. Physical Review a, 1988. 37(2): p. 599-569, Smith, G. W. and Vaz, N. A., *The relationship between formation kinetics and microdroplet size of epoxy based polymer-dispersed liquid-crystals*. Liquid Crystals, 1988. 3(5): p. 543-571, Vaz, N. A. and Montgomery, G. P., Refractive-indexes of polymer-dispersed liquid-crystal film materials—epoxy based system. Journal Of Applied Physics, 1987. 62(8): p 3161-3172). In ultraviolet light (UV) initiated polymerisation, the rate of curing may be changed by changing the light intensity (Whitehead Jr, J. B., Gill, N. L., and Adams, C., *Characterization of the phase separation of the E7 liquid crystal component mixtures in a thiol-ene based polymer*. Proc. SPIE, 2000. 4107: p. 189). The PIPS method using free-radical polymerisation is by far the most studied, and the majority of free-radical polymerisation systems are initiated by UV light. The process has several advantages over other methods such as, better phase separation, uniform droplet size, and better control of the droplet size. However, the presence of dyes that absorb UV and visible radiation in the mixture prior to curing can lead to incomplete or the complete prevention of successful curing. Furthermore, the dyes may decompose upon curing.

Another technique used for obtaining PDLC composites is thermal induced phase separation (TIPS). This technique can be used for liquid crystal materials and thermoplastic materials which are capable of forming a homogenous solution above the melt temperature of the polymer. The homogenous solution of liquid crystal in the thermoplastic melt is cooled below the melting point of the thermoplastic material, thereby causing a phase separation of the liquid crystal. The droplet size of the liquid crystal is determined by the rate of cooling and a number of other material parameters. Examples of TIPS-prepared composites are polymethylmethacrylate (PMMA) and polyvinylformal (PVF) with cyanobiphenyl liquid crystal. Generally, the concentrations of liquid crystals required for TIPS-film are larger in comparison to PIPS-prepared films.

Another technique used to prepare polymer dispersed liquid crystal composites is solvent-induced phase separation (SIPS). This makes use of a liquid crystal and a thermoplastic material dissolved in a common solvent thereby forming a homogenous solution. The ensuing evaporation of the solvent results in phase separation of the liquid crystal, droplet formation and growth, and polymer gelation. Solvent evaporation can also be used in conjunction with thermal processing of materials which melt below their decomposition temperature. First of all films are formed on a suitable substrate using standard film coating techniques, e.g. doctor blading, spin coating, web coating, etc. The solvent is thereafter removed with no concern of droplets size or density. Then the film is warmed again to re-dissolve the liquid crystal in the polymer and then cooled at a rate which is chosen to give the desired droplet size and density. In effect, the latter example is a combination of SIPS with TIPS.

Electronic device display technologies require displays with high brightness and contrast, low power consumption, and fast refresh speeds. For flexible displays, polymer thin film technology is being explored and in particular, polymer dispersed liquid crystal films (=PDLC) are of interest. In these materials it is important to achieve good phase separation of the components with minimal co-dissolution. Such co-dissolution reduces the scattering-switching contrast between "on" and "off" states. Furthermore, if coloured dyes are used to produce coloured PDLC films, dissolution of the dye into the inactive polymer matrix reduces colour-switching contrast. An additional impediment is that in the preferred curing method, that of ultra-violet light photo curing, many coloured dyes undergo photodegradation. There are other advantages which would make it appear desirable to add dyes to PDLC composite films. Addition of dichroic dyes can, for example lead to faster "turn-on" times.

Another problem commonly encountered with PDLC composites is the fact that additional components dissolved in the liquid crystal are sensitive to the phase separation process and frequently are damaged in the course of the polymerization and/or the formation of the polymer matrix. For example it is very difficult to include UV-sensitive dyes which survive photoinduced polymerization. Accordingly it has been a problem to produce PDLC-composites which are coloured by the inclusion of dyes.

Some of these problems had been solved by a method reported previously (EP 01 129 709, A. Masutani, A. Roberts, B. Schueller, A. Sakaigawa and A Yasuda, "Improved Performance of a Novel Polariser-Free Dye Doped Polymer Dispersed Liquid Crystal for Reflective Display", Journal of the Sid, Vol. 12/3, a. Masutani, A. Roberts, A. Yasuda, A. Sakaigawa, G. Cross and D. Bloor, "A Novel Polariser-Free Dye Doped Polymer Dispersed Liquid Crystal for Reflective TFT Display", 22nd International Display Research Conference Proceedings, pp 47-50 (2002 October, Nice), A. Masutani, A. Roberts, B. Schueller, A. Sakaigawa and A. Yasuda, "Improved Performance of a Novel Polariser-Free Dye Doped Polymer Dispersed Liquid Crystal for Reflective Display", 23rd International Display Research Conference Proceedings (2003 September, Phoenix)).

In these methods the polymer matrix is formed in the presence of a first material, preferably a liquid crystal material, which, after formation of the polymer matrix is removed and replaced by a second material which is liquid crystalline. In order for this removal and replacement step to take place, the method involved splitting a cell apart in order to wash out the first material remaining in the polymer matrix.

However, it has remained a problem to produce PDLC-composites and also SPDLC-composites (sponge like polymer dispersed liquid crystal cells) which are colored by the inclusion of dyes (D-SPDLC=dye doped sponge like polymer dispersed liquid crystal cell). Furthermore it has been a problem to produce liquid crystal cell displays which can be used as color displays.

Accordingly, it was an object of the present invention to provide for an array of liquid crystal cells that allows the generation of colored images which are much brighter than images formed by conventional liquid crystal displays. Furthermore, it was an object of the present invention to provide for an array of liquid crystal cells allowing the generation of colored images with a high contrast and a high reflectivity in comparison to conventional color displays. It has furthermore been an object of the present invention to provide for a method of fabrication of such arrays useful in a color display with high brightness and high contrast.

The objects of the present invention are solved by a method of forming an array of polymer dispersed liquid crystal cells, said array comprising at least two polymer dispersed liquid crystal cells of a first and second type, respectively, at least one of which, preferably both are dye doped, wherein each of said polymer dispersed liquid crystal cells comprises a porous polymer matrix having pores or voids, which are filled with a liquid crystal of a first and second type, respectively, at least one of which, preferably both are dye doped, said method comprising the following steps:

a) forming said porous polymer matrix in the presence of a liquid material, preferably a liquid crystalline material, such that said liquid material, preferably said liquid crystalline material is dispersed in said pores of said porous polymer matrix, b) replacing said liquid material, preferably said liquid crystalline material in said porous polymer matrix by said liquid crystal of a first and/or second type, c) arranging said polymer dispersed liquid crystal cells of a first and second type, respectively, in any desired pattern, preferably in a pattern of parallel lines or in a mosaic pattern of dots or in a stacked structure of layers wherein said polymer dispersed liquid crystal cells of a first and second type are in different layers on top of each other, or in any combination of the aforementioned patterns and structures.

By step b), effectively, liquid crystal cells of a first and second type are formed, depending on which type of liquid crystal is used. For each type of liquid crystal cells (i.e. first type, second type), steps a) and b) need to be performed.

In one embodiment, the stacked structure of layers comprises any number of layers, preferably more than two, more preferably a multiplicity of layers.

In one embodiment said array of polymer dispersed liquid crystal cells comprises at least three polymer dispersed liquid crystal cells of a first, second and third type, respectively, each of which are dye doped, wherein each of said polymer dispersed liquid crystal cells comprises a porous polymer matrix having pores or voids, which are filled with a dye doped liquid crystal of a first, second and third type, respectively, said method comprising the following steps:

a) forming said porous polymer matrix in the presence of a liquid material, preferably a liquid crystalline material, such that said liquid material, preferably said liquid crystalline material is dispersed in said pores of said porous polymer matrix.

b) replacing said liquid material, preferably said liquid crystalline material in said porous polymer matrix by said dye doped liquid crystal of a first, second and/or third type, c) arranging said dye doped polymer dispersed liquid crystal cells of a first, second and third type, respectively, in any desired pattern, preferably a pattern of parallel lines or in a mosaic pattern of dots or in a stacked structure of layers wherein said polymer dispersed liquid crystal cells of a first, second and third type are in different layers on top of each other, or in any combination of the aforementioned patterns and structures.

By step b), effectively, liquid crystal cells of a first, second and third type are formed, depending on which type of liquid crystal is used. For each type of liquid crystal cell (i.e. first, second and third), steps a) and b) need to be performed. In one embodiment, the stacked structure of layers comprises any number of layers, preferably a multiplicity of layers.

Preferably, said dye doped polymer dispersed liquid crystal cells of a first, second and third type are each doped with a different dye, wherein, preferably, said different dyes are selected from the group comprising red dyes, green dyes, blue dyes, cyan dyes, magenta dyes and black dyes.

In one embodiment said polymer dispersed liquid crystal cells of a first, second and third type are doped with a red dye, a green dye and a blue dye, respectively.

Preferably, said array of polymer dispersed liquid crystal cells additionally comprises a polymer dispersed liquid crystal cell of a fourth type, which is dye doped, wherein, preferably, said polymer dispersed liquid crystal cells of a first, second, third and fourth type are doped with a cyan dye, a green dye, a magenta dye and a yellow dye, respectively. It is clear to someone skilled in the art that a dye having a specific color may, in fact, be a mixture of two dyes. For example, a green dye may be made by mixing a blue dye and a yellow dye. Furthermore all single colors, for example a red colour, may not necessarily be produced by a single red dye only. For example, depending on each dye's color absorption, two or more dyes may be used to produce a single red color. Likewise it is clear to someone skilled in the art that, even though here applicants talk of "dyes" producing a color, ultimately it will be the respective liquid crystal that is doped with this dye, which will appear in this particular dye's color. Hence one can also talk of a red, green, blue . . . etc. dichroic liquid crystal (DLC).

In one embodiment there is a plurality of liquid crystal cells of said first, and second and, if present, third and/or fourth type.

Preferably, step c) is performed such that a pattern of lines, preferably parallel lines, of dye doped polymer dispersed liquid crystal cells is created, in the order:

a line of a liquid crystal cell of said first type, adjacent to a line of a liquid crystal cell of said second type, adjacent to, if present, a line of a liquid crystal cell of said third type, adjacent to either a line of a liquid crystal cell of said first type or, if present, adjacent to a line of a liquid crystal cell of said fourth type, adjacent to a line of a liquid crystal cell of said first type.

In one embodiment said line of a liquid crystal cell of said first type is, on one side, adjacent to a line of a liquid crystal cell of said second type, and is, on the other side:

adjacent to a line of a liquid crystal cell of said second type, provided there are only liquid crystal cells of a first and second type in said array, or, if present, adjacent to a line of a liquid crystal cell of said third type, provided there are only liquid crystal cells of a first, second and third type in said array, or, if present, adjacent to a line of liquid crystal cell of said fourth type, provided there are liquid crystal cells of a first, second, third and fourth type in said array.

In one embodiment said lines are spaced apart at regular intervals of a distance in the range of from 0.01 mm to 1.0 mm, preferably 0.05 mm to 0.75 mm, more preferably 0.1 mm to 0.5 mm, most preferably about 0.25 mm.

Preferably, said lines have a width in the range of from 1 µm to 1.0 mm, preferably 10 µm to 500 µm, more preferably 50 µm to 100 µm, most preferably about 80 µm.

In one embodiment step c) is performed such that a mosaic pattern of dots of dye doped polymer dispersed liquid crystal cells is created, wherein said dots are arranged in lines and rows, and each of said dots is occupied by a dye doped polymer dispersed liquid crystal cell, said lines and said rows preferably being perpendicular to each other, wherein, preferably, adjacent dots in said rows are occupied by dye doped polymer dispersed liquid crystal cells, said cells being dye doped in the order . . . -red-green-red-green- . . . and/or . . . green-blue-green-blue- . . . and/or . . . -yellow-cyan-yellow-cyan- . . . and/or . . . -green-magenta-green-magenta- . . .

In one embodiment adjacent dots in said columns are occupied by dye doped polymer dispersed liquid crystal cells, said cells being dye doped in the order . . . -red-green-red-green- . . . and/or . . . -green-blue-green-blue- . . . and/or . . . -yellow-green-yellow-green- . . . and/or . . . -cyan-magenta-cyan-magenta- . . .

Preferably, step c) is performed concomitantly with step a).

In one embodiment step c) is performed by a method selected form the group comprising: electrodeposition, solvent casting, capillary filling, inkjet printing, micro-dispensing, screen printing, electrophotography, ionography, magnetography, thermography, stamping and letterpress.

In one embodiment step c) is performed such that said dye doped polymer dispersed liquid crystal cells of a first, second and, if present, a third and fourth type are arranged in said desired pattern in a first plane.

Preferably, the method according to the present invention, comprises the additional step:

d) arranging further dye doped polymer dispersed liquid crystal cells of a first, second and possibly, if desired, a third and/or fourth type in a desired pattern, preferably in a pattern of parallel lines or in a mosaic pattern of dots, in a second plane, different from said first plane, and preferably on top of said first plane.

In a preferred embodiment said desired pattern in said second plane is oriented such that a longitudinal direction of said pattern is perpendicular or parallel to a longitudinal direction of said desired pattern in said first plane.

In one embodiment of the method according to the present invention, step d) is performed in the manner as defined for step c) in ally of the embodiments described above.

The objects of the present invention are solved by an array of polymer dispersed liquid crystal cells produced by the method according to the present invention, wherein said array comprises at least two polymer dispersed liquid crystal cells of a first and second type, respectively, at least one of which, preferably both are dye doped, wherein each of said polymer dispersed liquid crystal cells comprises a porous polymer matrix having pores or voids, which are filled with a liquid crystal of a first and second type, respectively, at least one of which, preferably both are dye doped, said polymer dispersed liquid crystal cells of a first and second type being arranged in any desired pattern, preferably in a pattern of parallel lines or in a mosaic pattern of dots, wherein said lines are spaced apart at regular intervals of a distance in the range of from 0.01 mm to 1.0 mm, preferably 0.05 mm to 0.75 mm, more preferably 0.1 mm to 0.5 mm, most preferably about 0.25 mm, and/or wherein said lines have a width in the range of from 1 μm to 1.0 mm, preferably 10 μm to 500 μm, more preferably 50 μm to 100 μm, most preferably about 80 μm, and/or wherein said dots in said mosaic pattern preferably have dimensions in the range of (50 μm-100 μm)×(100 μm-350 μm), more preferably about 80 μm×250 μm.

Preferably, the array according to the present invention comprises at least three polymer liquid crystal cells of a first, second and third type, respectively, each of which are dye doped, wherein each of said polymer dispersed liquid crystal cells comprises a porous polymer matrix having pores or voids, which are filled with a dye doped liquid crystal of a first, second and third type, respectively, wherein said dye doped polymer dispersed liquid crystal cells of a first, second and third type, respectively are arranged in any desired pattern, preferably a pattern of a parallel lines or in a mosaic pattern of dots.

The objects of the present invention are also solved by the use of the array according to the present invention in a color display or bi-tone display.

As used herein the term "a polymer dispersed liquid crystal cell of a first type" or, more generally, "a polymer dispersed liquid crystal cell of a . . . n-th type" is meant to signify that such a liquid crystal cell has one characteristic feature that distinguishes such cell from another cell of a different, for example second type (n+1-th type). Such characteristic may be the type of liquid crystal material within such cell and/or the type of dye that is used in such liquid crystal cell, if the cell is a dye doped cell. Preferably such characteristic is the type of the dye involved.

As used herein, the term "bi-tone display" refers to a display which only has two different types of colours or even one colour at two different densities at hand for forming an image.

Many different patterns for arranging the polymer dispersed liquid crystal cells within the array are envisaged. One possible arrangement is a set of parallel lines, another one is a mosaic pattern of dots, wherein the dots are preferably arranged in rows and columns perpendicular to each other. A particularly preferred embodiment is the so-called Bayer pattern which is an arrangement of red, green and blue dots in a matrix of rows and columns. An example of such an arrangement is shown in FIGS. 9a) and 9c) A Bayer-pattern is known to someone skilled in the art and is also sometimes referred to as "Bayer array pattern", "Bayer mask", "interlaced pattern", "filter", "mosaic" or "Color Filter Array". A "dot", as used herein, may have any regular or irregular geometrical shape. Preferably a "dot" has a square, rectangular, circular or oval shape.

Reference is now made to the figures, wherein

Figure 9A:
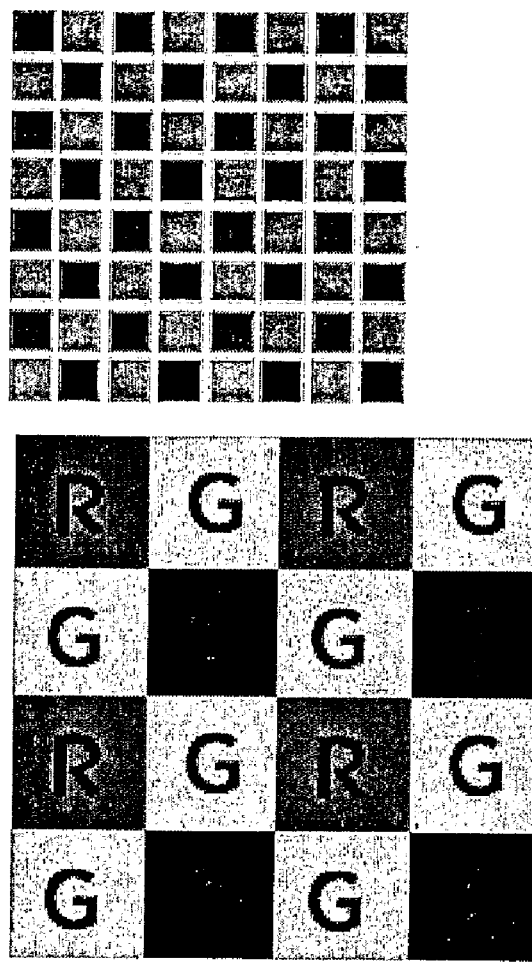
Figure 9B:
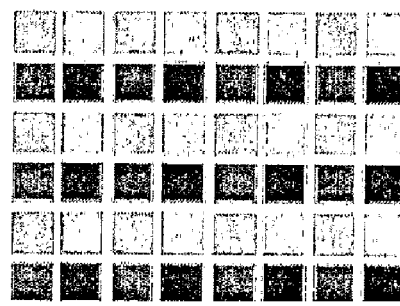
Figure 9C:
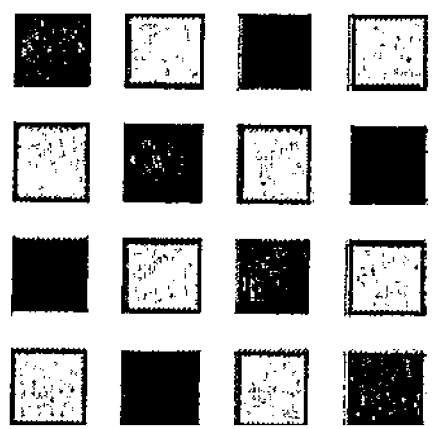
Figure 10:
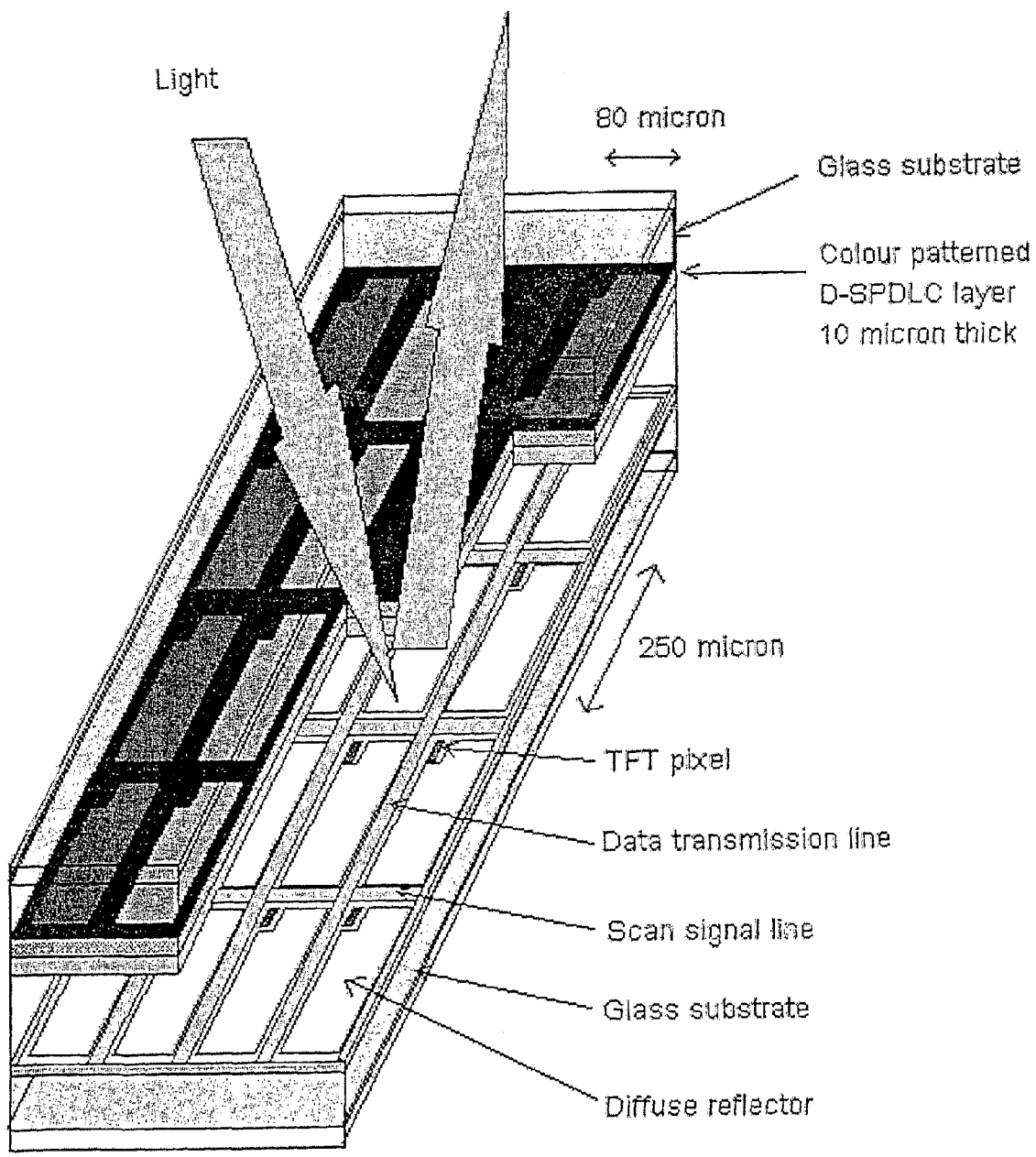

FIGS. 9a and b show two examples of preferred patterns of the array of liquid crystal cells according to the present invention, namely a red-green-blue-filter (RGB filter) and a cyan-magenta-yellow-filter (CMY filter), arranged in the so-called Bayer pattern, and FIG. 9c shows a so-called modified (diagonal) Bayer pattern; and FIG. 10 shows an exemplary display according to the present invention, using TFT pixels and a colour patterned dye doped sponge-like polymer dispersed liquid crystal cell (D-SPDLC), which may for example be patterned in a Bayer pattern, as described above.

Reference is now made to the following examples which is given to illustrate, not to limit the invention.

EXAMPLE

Figure 1:
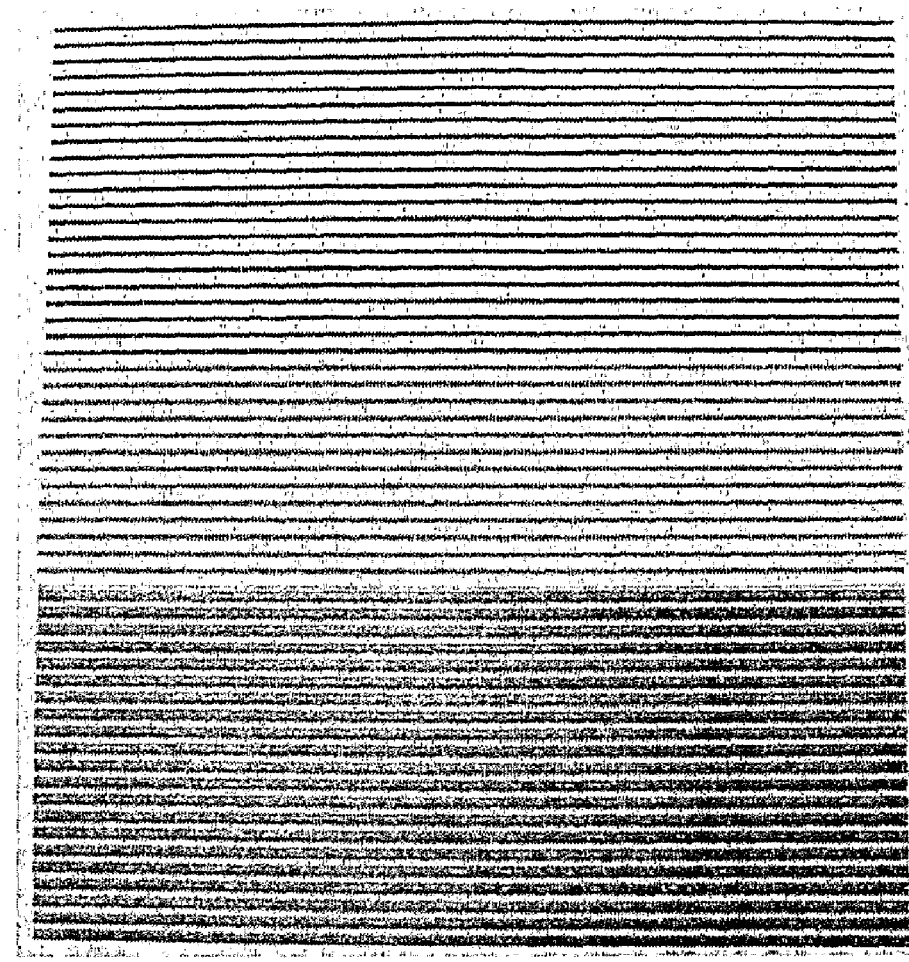
FIG. 1 shows the concept of color-striped lines which are laserprinted on a sheet of paper, for demonstration purposes.

FIG. 1 shows the concept for colour-striped lines laser printed on a sheet of paper. The width of a blue (B) line is 1 mm. Between two blue lines there is a blank/white space of 2 mm. This is the case for red (R) and green (G) lines. At the bottom of FIG. 1, R, G & B lines are aligned repeatedly in order, next to each other, with no space in between.

Figure 2:
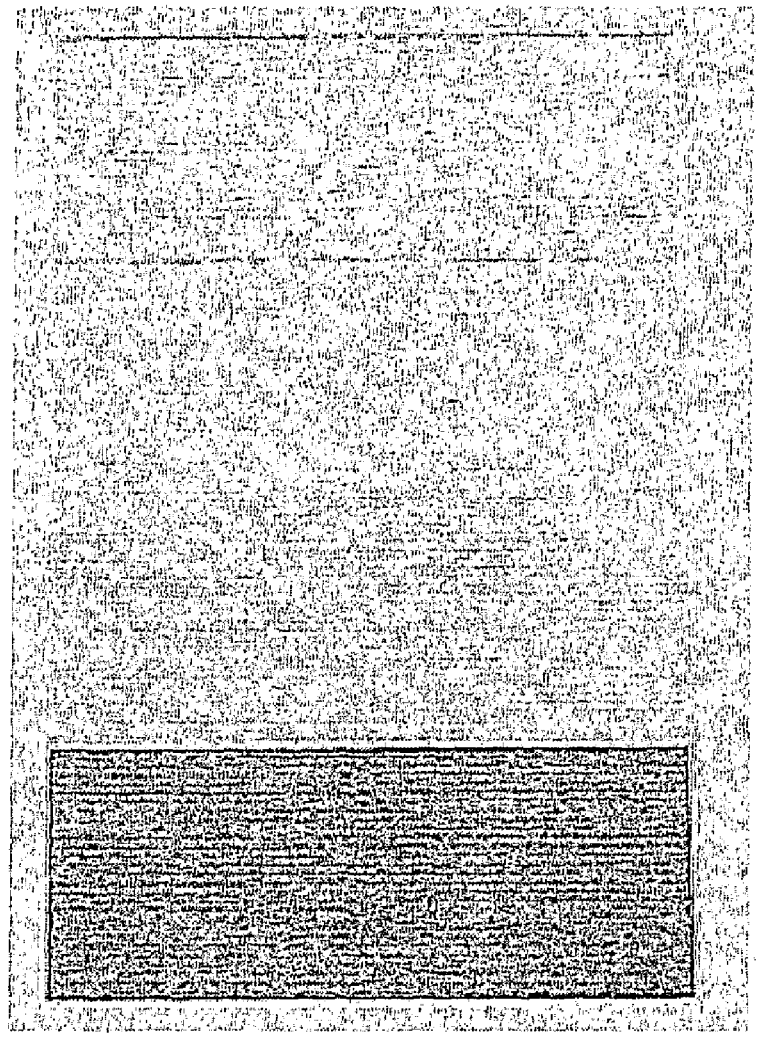
FIG. 2 shows color-striped lines laserprinted on a sheet of paper with a smaller line width and a smaller spacing apart.

FIG. 2 shows colour-striped lines laser printed on a sheet of paper exactly the same way as FIG. 1. However, this time, each line width was adjusted to be 0.25 mm with the spacing of 0.5 mm. This is close to a geometry used for a colour filter of QVGA LCD display (ACX704 Sony). The actual line width of a colour filter of QVGA LCD display is 0.08 mm with a spacing of 0.16 nm.

One can see that by adopting a "colour filter"-like geometry with coloured materials, it is possible to make a colour display. This material can be a dichroic LC or dichroic PDLC that can switch between a coloured- and white-state.

Sample Preparation

For the fabrication of colour PDLC, the same procedure as that disclosed in A. Masutani, A. Roberts, B. Schlueller, A. Sakaigawa and A. Yasuda, "Improved Performance of a Novel Polariser-Free Dye Doped Polymer Dispersed Liquid Crystal for Reflective Display", Journal of the SID, Vol. 12/3, A. Masutani, A. Roberts, A. Yasuda, A. Sakaigawa, G. Cross and D. Bloor, "A Novel Polariser-Free Dye Doped Polymer Dispersed Liquid Crystal for Reflective TFT Display", 22nd International Display Research Conference Proceedings, pp 47-50 (2002 October, Nice) & A. Masutani, A. Roberts, B.

Figure 3:
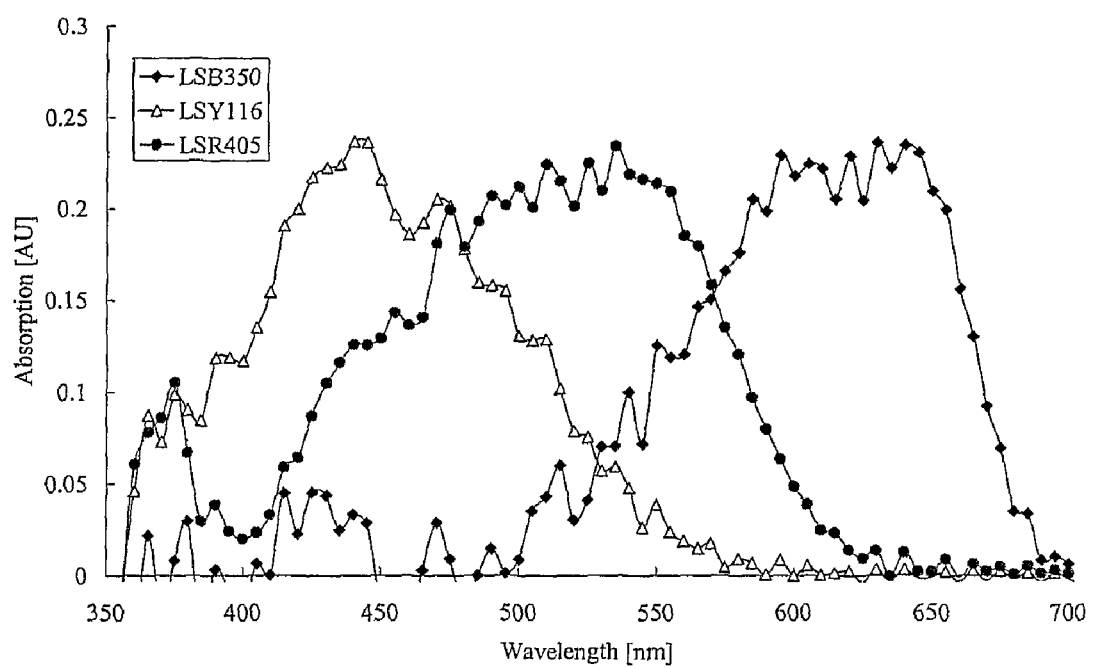
FIG. 3 shows the absorption of a blue, red and green dye which had been used to dope a liquid crystal, in this case E7LC (commercially available from Merck and called either E7 or BL001)

Schueller, A. Sakaigawa and A. Yasuda, "Improved Performance of a Novel Polariser-Free Dye Doped Polymer Dispersed Liquid Crystal for Reflective Display", 23rd International Display Research Conference Proceedings (2003 September, Phoenix)] was used. 1.07 wt % LSB350 was doped to TL203 LC to achieve blue LC. 0.52 wt % LSR405 was doped to TL203 LC to achieve red LC. 1.07 wt % LSB350 and 0.62 wt % LSY116 were doped to TL203 LC to achieve green LC. 3 wt % Black-4 was doped to TL203 LC to achieve black LC. All of the dyes were purchased from Mitsubishi Chemical in Japan. FIG. 3 shows the absorption of each dye in E7 LC.

Figure 4:
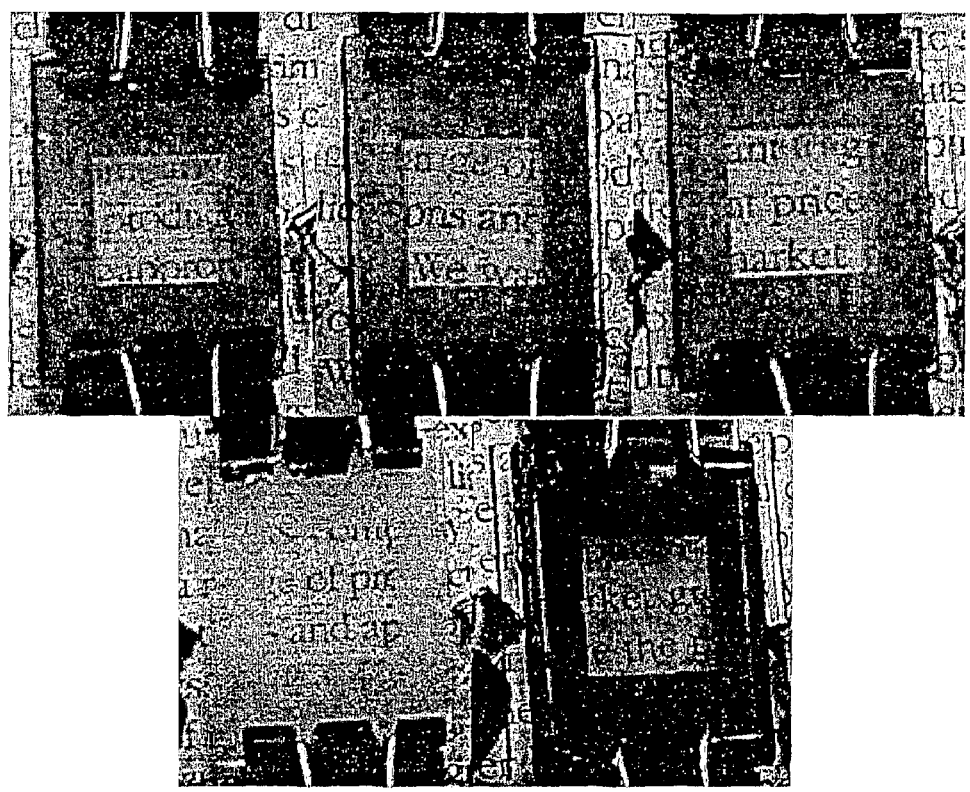
FIG. 4 shows dye-doped sponge-like polymer dispersed liquid crystal cells (D-SPDLCs) using the dyes of FIG. 3 (from left; red, green, blue, undoped and black dye)
Figure 5:
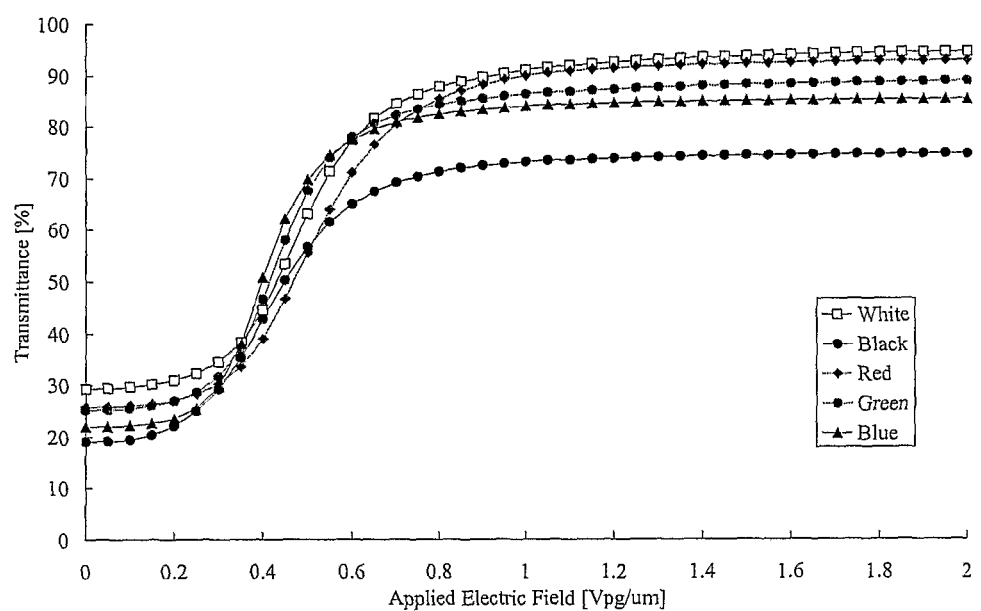
FIG. 5 shows the transmittance vs. applied electric field in the dye-doped SPDLCs of FIG. 4.
Figure 6:
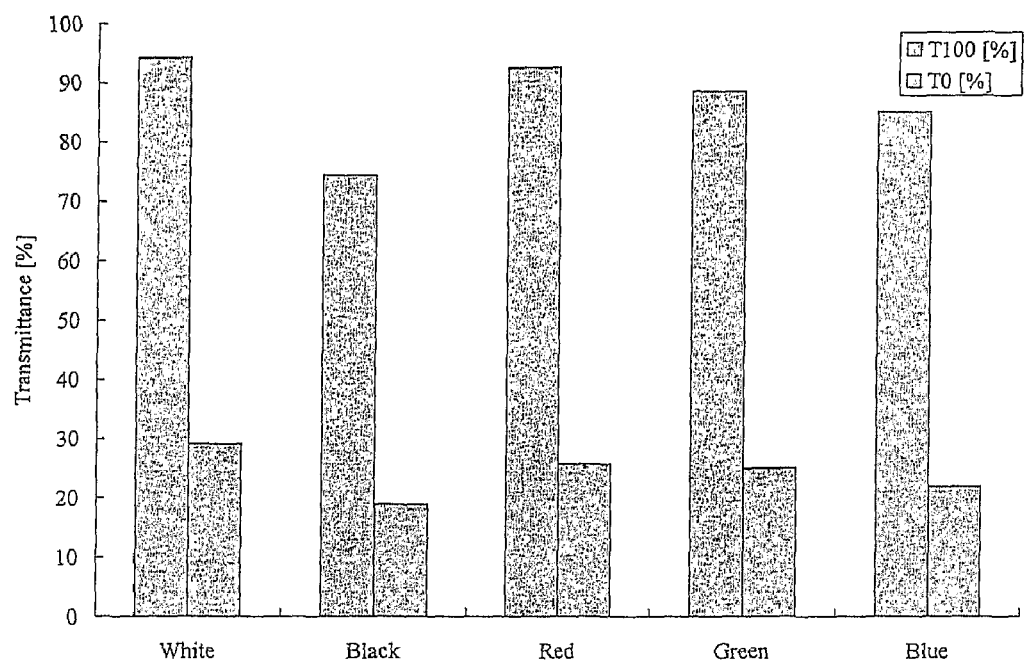
FIG. 6 shows the on-stage transmittance (T100) and the off-stage transmittance (T0) of the liquid crystal cells of FIG. 4.
Figure 7:
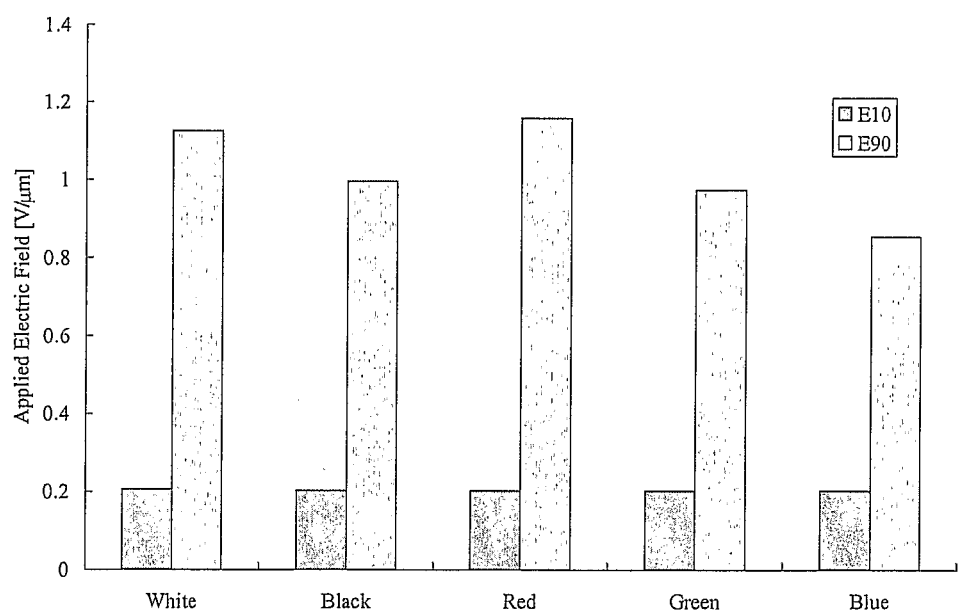
FIG. 7 shows the electric field required to achieve 10% transmittance of T100 (E10) and the electric field required to achieve 90% transmittance of T100 (E90) in the liquid crystal cells of FIG. 4.
Figure 8:
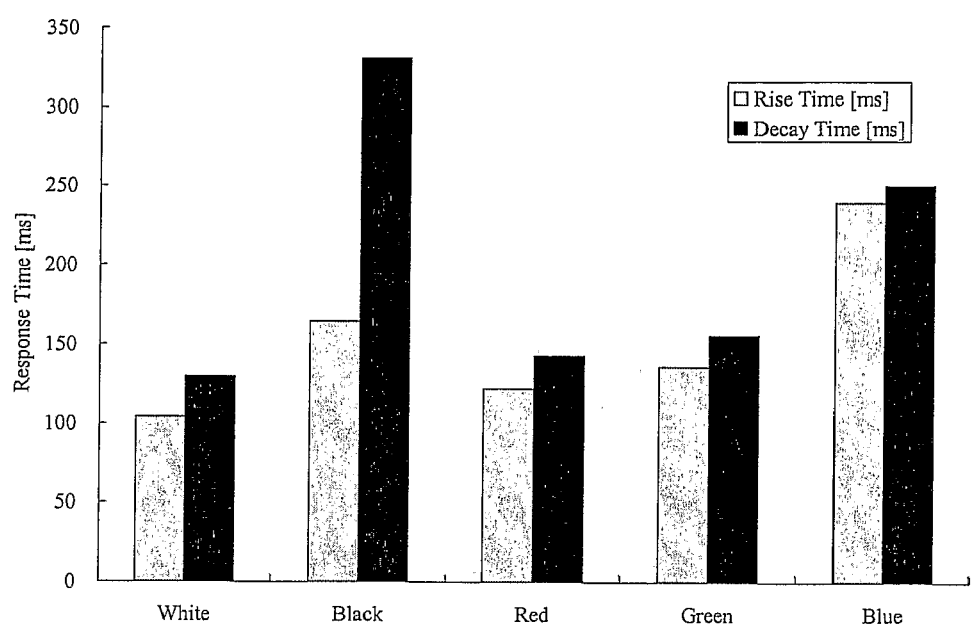
FIG. 8 shows the response time in ms of liquid crystal cells of FIG. 4.

By using the different types of dyes, one can achieve D-SPDLCs as shown in FIG. 4 (from left, one can see D-SPDLCs doped with red, green, blue, no (=undoped) and black dye). By patterning these colour D-SPDLCs in 0.08 mm line width, it is possible to male a display as shown in FIG. 2.

Characterisation of the Colour D-SPDLC

The electro-optic properties of the above colour D-SPDLCs were measured to show that the above test cells do behave as expected, and that the dopants (also known as dyes) do not alter the properties of the LC too much. However, as the following FIGS. 5-8 show, different dopants (and different dopant concentrations) slightly affects the host LC in different ways. This means that the nature of the dopant and its concentration together with its driving must be optimised when they are all to be used on a single substrate (e.g. a TFT panel).

The features disclosed in the specification, the claims and/or in the accompanying drawings, may, both separately, and in any combination thereof, be material for realising the invention in various forms thereof.

The invention claimed is
1. A method of forming an array of polymer dispersed liquid crystal cells, said array comprising at least two polymer dispersed liquid crystal cells of a first and second type, respectively, at least one of which, is dye doped, wherein each of said polymer dispersed liquid crystal cells comprises a porous polymer matrix having pores or voids, which are filled with a liquid crystal of a first and second type, respectively, at least one of which, is dye doped, said method comprising the following steps:
   a) forming said porous polymer matrix in the presence of a liquid crystalline material, such that said liquid crystalline material is dispersed in said pores of said porous polymer matrix,
   b) replacing said liquid crystalline material in said porous polymer matrix by said liquid crystal of a first or second type,
   c) arranging said polymer dispersed liquid crystal cells of a first and second type, respectively, in a pattern of parallel lines, in a mosaic pattern of dots, or in a stacked structure of layers, wherein said polymer dispersed liquid crystal cells of a first and second type are in different layers on top of each other in the stacked structure.

2. The method according to claim 1, wherein said array of polymer dispersed liquid crystal cells comprises at least three polymer dispersed liquid crystal cells of a first, second and third type, respectively, each of which are dye doped, wherein each of said polymer dispersed liquid crystal cells comprises a porous polymer matrix having pores or voids, which are filled with a dye doped liquid crystal of a first, second and third type, respectively, said method comprising the following steps:
   a) forming said porous polymer matrix in the presence of a liquid crystalline material, such that said liquid crystalline material is dispersed in said pores of said porous polymer matrix.
   b) replacing said liquid crystalline material in said porous polymer matrix by said dye doped liquid crystal of a first, second or third type,
   c) arranging said dye doped polymer dispersed liquid crystal cells of a first, second and third type, respectively, in a pattern of parallel lines, in a mosaic pattern of dots, or in a stacked structure of layers, wherein said polymer dispersed liquid crystal cells of a first, second and third type are in different layers on top of each other in the stacked structure.

3. The method according to claim 2, wherein said dye doped polymer dispersed liquid crystal cells of a first, second and third type are each doped with a different dye.

4. The method according to claim 3, wherein said different dyes are selected from the group comprising red dyes, green dyes, blue dyes, cyan dyes, magenta dyes and black dyes.

5. The method according to claim 3, wherein said polymer dispersed liquid crystal cells of a first, second and third type are doped with a red dye, a green dye and a blue dye, respectively.

6. The method according to claim 2, wherein said array of polymer dispersed liquid crystal cells additionally comprises a polymer dispersed liquid crystal cell of a fourth type, which is dye doped.

7. The method according to claim 6, wherein said polymer dispersed liquid crystal cells of a first, second, third and fourth type are doped with a cyan dye, a green dye, a magenta dye and a yellow dye, respectively.

8. The method according to claim 1, wherein there is a plurality of liquid crystal cells of said first, second, third or fourth type.

9. The method according to claim 1, wherein step c) is performed such that a pattern of parallel lines, of dye doped polymer dispersed liquid crystal cells is created, in the order: a line of a liquid crystal cell of said first type, adjacent to a line of a liquid crystal cell of said second type, adjacent to a line of a liquid crystal cell of a third type, adjacent to either a line of a liquid crystal cell of said first type or, adjacent to a line of a liquid crystal cell of a fourth type, adjacent to a line of a liquid crystal cell of said first type.

10. The method according to claim 9, wherein said line of a liquid crystal cell of said first type is, on one side, adjacent to a line of a liquid crystal cell of said second type, and is, on the other side: adjacent to a line of a liquid crystal cell of said second type, provided there are only liquid crystal cells of a first and second type in said array, or, adjacent to a line of a liquid crystal cell of said third type, provided there are only liquid crystal cells of a first, second and third type in said array, or, adjacent to a line of liquid crystal cell of said fourth type, provided there are liquid crystal cells of a first, second, third and fourth type in said array.

11. The method according to claim 9, wherein said lines are spaced apart at regular intervals of a distance in the range of from 0.01 mm to 1.0 mm.

12. The method according to claim 9, wherein said lines have a width in the range of from 1 μm to 1.0 mm.

13. The method according to claim 1, wherein step c) is performed such that a mosaic pattern of dots of dye doped polymer dispersed liquid crystal cells is created, wherein said dots are arranged in lines and rows, and each of said dots is occupied by a dye doped polymer dispersed liquid crystal cell, said lines and said rows being perpendicular to each other.

14. The method according to claim 13, wherein adjacent dots in said rows are occupied by dye doped polymer dispersed liquid crystal cells, said cells being dye doped in the order . . . -red-green-red-green- . . . or . . . -green-blue-green-blue- . . . or . . . -yellow-cyan-yellow-cyan- . . . or . . . -green-magenta-green-magenta.

15. The method according to claim 13, wherein adjacent dots in columns are occupied by dye doped polymer dispersed liquid crystal cells, said cells being dye doped in the order . . . -red-green-red-green- . . . or . . . -green-blue-green-blue- . . . or . . . -yellow-green-yellow-green- . . . or . . . -cyan-magenta-cyan-magenta.

16. The method according to claim 1, wherein step c) is performed concomitantly with step a).

17. The method according to claim 1, wherein step c) is performed by a method selected from the group comprising: electrodeposition, solvent casting , capillary filling, inkjet printing, micro-dispensing, screen printing, electrophotography, ionography, magnetography, thermography, stamping and letterpress.

18. The method according to claim 1, wherein step c) is performed such that dye doped polymer dispersed liquid crystal cells of a first, second, a third and fourth type are arranged in said desired pattern in a first plane.

19. The method according to claim 18, wherein said method comprises the additional step: d) arranging further dye doped polymer dispersed liquid crystal cells of a first, second, third or fourth type in a desired pattern, in a pattern of parallel lines or in a mosaic pattern of dots, in a second plane, different from said first plane, and on top of said first plane.

20. The method according to claim 19, wherein said desired pattern in said second plane is oriented such that a longitudinal direction of said pattern is perpendicular or parallel to a longitudinal direction of said desired pattern in said first plane.

21. The method according to claim 19, wherein step d) is performed by a method selected from the group comprising: electrodeposition, solvent casting , capillary filling, inkjet printing, micro-dispensing, screen printing, electrophotography, ionography, magnetography, thermography, stamping and letterpress.

22. An array of polymer dispersed liquid crystal cells produced by the method according to claim 1, wherein said array comprises at least two polymer dispersed liquid crystal cells of a first and second type, respectively, at least one of which is dye doped, wherein each of said polymer dispersed liquid crystal cells comprises a porous polymer matrix having pores or voids, which are filled with a liquid crystal of a first and second type, respectively, at least one of which is dye doped, said polymer dispersed liquid crystal cells of a first and second type being arranged in a pattern of parallel lines, in a mosaic pattern of dots, or in a stacked structure of layers, wherein said polymer dispersed liquid crystal cells of a first and second type are in different layers on top of each other wherein said lines are spaced apart at regular intervals of a distance in the range of from 0.01 mm to 1.0 mm, or wherein said lines have a width in the range of from 1 μm to 1.0 mm, or wherein said dots in said mosaic pattern have dimensions in the range of (50 μm to 100 μm)×(100 μm to 350 μm).

23. The array according to claim 22 comprising at least three polymer liquid crystal cells of a first, second and third type, respectively, each of which are dye doped, wherein each of said polymer dispersed liquid crystal cells comprises a porous polymer matrix having pores or voids, which are filled with a dye doped liquid crystal of a first, second and third type, respectively, wherein said dye doped polymer dispersed liquid crystal cells of a first, second and third type, respectively are arranged in a pattern of a parallel lines or in a mosaic pattern of dots.

24. A color display or bi-tone display including the array of claim 22 or claim 23.

* * * * *

UNITED STATES PATENT AND TRADEMARK OFFICE
CERTIFICATE OF CORRECTION

| | | |
|---|---|---|
| PATENT NO. | : 8,125,591 B2 | Page 1 of 1 |
| APPLICATION NO. | : 11/816427 | |
| DATED | : February 28, 2012 | |
| INVENTOR(S) | : Akira Masutani et al. | |

It is certified that error appears in the above-identified patent and that said Letters Patent is hereby corrected as shown below:

On the title page, Item (86), the PCT information is incorrect. Item (86) should read:

-- (86) PCT No.: PCT/EP2006/000821

§ 371 (c)(1),
(2), (4) Date: Feb. 27, 2008 --

Signed and Sealed this
Thirty-first Day of July, 2012

David J. Kappos
*Director of the United States Patent and Trademark Office*